(12) United States Patent
Koley et al.

(10) Patent No.: US 9,807,004 B2
(45) Date of Patent: Oct. 31, 2017

(54) SYSTEM AND METHOD FOR SOFTWARE DEFINED ROUTING OF TRAFFIC WITHIN AND BETWEEN AUTONOMOUS SYSTEMS WITH ENHANCED FLOW ROUTING, SCALABILITY AND SECURITY

(71) Applicant: Google Inc., Mountain View, CA (US)

(72) Inventors: Bikash Koley, Sunnyvale, CA (US); Steven Padgett, Sunnyvale, CA (US); Ankur Jain, Mountain View, CA (US); Arjun Singh, Mountain View, CA (US); Amin Vahdat, Los Altos, CA (US); Mahesh Kallahalla, Sunnyvale, CA (US); Mukarram Tariq, Los Gatos, CA (US)

(73) Assignee: Google Inc., Mountain View, CA (US)

(*) Notice: Subject to any disclaimer, the term of this patent is extended or adjusted under 35 U.S.C. 154(b) by 373 days.

(21) Appl. No.: 14/478,217

(22) Filed: Sep. 5, 2014

(65) Prior Publication Data

US 2015/0281066 A1    Oct. 1, 2015

Related U.S. Application Data

(60) Provisional application No. 61/973,650, filed on Apr. 1, 2014.

(51) Int. Cl.
*H04L 12/741* (2013.01)
*H04L 12/947* (2013.01)
(Continued)

(52) U.S. Cl.
CPC .............. *H04L 45/74* (2013.01); *H04L 45/02* (2013.01); *H04L 49/25* (2013.01); *H04L 49/70* (2013.01); *H04L 45/742* (2013.01)

(58) Field of Classification Search
CPC ......... H04L 49/25; H04L 49/70; H04L 45/02; H04L 45/42; H04L 45/74; H04L 45/742
See application file for complete search history.

(56) References Cited

U.S. PATENT DOCUMENTS 8,369,333 B2 * 2/2013 Hao .................... H04L 12/4633
370/392
2013/0003745 A1 1/2013 Nishimura
(Continued)

FOREIGN PATENT DOCUMENTS

WO      2014035665 A1     3/2014
WO    WO-2014/035664 A1   3/2014

OTHER PUBLICATIONS

International Search Report and Written Opinion dated Jun. 10, 2015 in PCT Application No. PCT/US2015/023079.
(Continued)

*Primary Examiner* — Habte Mered
(74) *Attorney, Agent, or Firm* — McDermott Will & Emery LLP

(57) ABSTRACT

An autonomous network and a corresponding routing method include determining routing paths by a controller, and providing the determined routing paths to a data packet processor located remotely from the controller. The data packet processor routes outgoing data packets, based on information from the controller, through a plurality of switches remotely from the data packet processor. Each switch includes a plurality of network interfaces. For an outgoing data packet, the data packet processor determines a network interface over which to transmit the data packet, and adds an indication of the determined network interface in a header of the data packet. The data packet processor forwards the modified data packet to the switch including the determined network interface. The switch identifies the (Continued)

network interface based on the indication, and transmits the outgoing data packet over the identified network interface.

25 Claims, 8 Drawing Sheets

(51) Int. Cl.
 *H04L 12/931* (2013.01)
 *H04L 12/751* (2013.01)
 *H04L 12/747* (2013.01)

(56) References Cited

U.S. PATENT DOCUMENTS

| | | | | |
|---|---|---|---|---|
| 2013/0044641 A1* | 2/2013 | Koponen | ................ | H04L 12/66 370/255 |
| 2014/0064283 A1* | 3/2014 | Balus | ................ | H04L 49/70 370/392 |
| 2014/0192645 A1* | 7/2014 | Zhang | ................ | H04L 47/12 370/235 |
| 2014/0195666 A1* | 7/2014 | Dumitriu | ............ | H04L 12/4625 709/223 |
| 2014/0233569 A1* | 8/2014 | Yong | ................ | H04L 45/64 370/392 |
| 2014/0294011 A1* | 10/2014 | Roessler | ................ | H04L 45/04 370/392 |
| 2015/0117454 A1* | 4/2015 | Koponen | ............ | H04L 61/2532 370/392 |
| 2016/0006652 A1* | 1/2016 | Oonuki | ................ | H04L 45/64 370/254 |

OTHER PUBLICATIONS

Open Networking Foundation, "OpenFlow Switch Specification", Version 1.3.1, Sep. 6, 2012, Retrieved from internet, URL: https://www.opennetworking.org/images/stories/downloads/sdn-resources/onf-specifications/openflow/openflow-spec-v1.3.1.pdf.
Extended European Search Report dated Aug. 27, 2015 in European Patent Application No. 15161523.4.
European Office Action dated Mar. 3, 2017 in European Patent Application No. 15161523.4 (5 pages).
Written Opinion dated May 26, 2017 in Singapore Patent Application No. 11201608137T.

* cited by examiner

SYSTEM AND METHOD FOR SOFTWARE DEFINED ROUTING OF TRAFFIC WITHIN AND BETWEEN AUTONOMOUS SYSTEMS WITH ENHANCED FLOW ROUTING, SCALABILITY AND SECURITY

CROSS-REFERENCE TO RELATED PATENT APPLICATIONS

This application claims priority to U.S. Provisional Patent Application No. 61/973,650, entitled "System And Method For Software Defined Routing Of Traffic Within And Between Autonomous Systems With Enhanced Flow Routing, Scalability And Security," filed on Apr. 1, 2014, the entirety of which is incorporated herein by reference.

BACKGROUND OF THE INVENTION

The present invention relates generally to the field of routing data traffic within and between autonomous systems.

With the increase in demand for connectivity and data services, data centers and autonomous service networks (ASNs), in general, are expected to handle huge requests for data content on a continuous basis. End-users expect data services to be continuously available with insignificant delays.

SUMMARY OF THE INVENTION

According to one aspect, the disclosure relates to an autonomous network that includes comprises a plurality of switches. Each switch includes a plurality of network interfaces, and is configured to receive a data packet addressed to a device located outside the network. The switch obtains from a header of the received outgoing data packet data indicative of a network interface over which to transmit the outgoing data packet, and transmits the outgoing data packet over the network interface indicated in the data obtained from the header. The autonomous network also includes a data packet processor, located remotely from the plurality of switches, and is configured, for an outgoing packet, to identify a network interface, within one of the plurality of switches, over which the corresponding switch is to transmit the outgoing data packet. The data packet processor adds an indication of the identified network interface to a header of the outgoing data packet, and forwards the outgoing data packet to the corresponding switch. The autonomous network also comprises a controller configured to determine routing paths for routing data packets, and provide routing information, associated with the determined routing paths, to the data packet processor, sufficient for the data packet processor to identify switches and network interfaces of switches to transmit outgoing data packets.

According to another aspect, this disclosure relates to a method for handling data packets in an autonomous network. The method includes receiving, by a switch of a plurality of switches, a data packet addressed to a device located outside the network. Each switch of the plurality of switches includes a plurality of network interfaces. The switch obtains, from a header of the received outgoing data packet data indicative of a network interface over which to transmit the outgoing data packet, and transmits the outgoing data packet over the network interface indicated in the data obtained from the header. A data packet processor, located remotely from the plurality of switches, identifies a network interface, associated with a switch of the plurality of switches, over which the corresponding switch is to transmit the outgoing data packet. The data packet processor adds an indication of the identified network interface to a header of the outgoing data packet, and forwards the outgoing data packet to the identified switch. A controller determines routing paths for routing data packets, and provides routing information, associated with the determined routing paths, to the data packet processor. The provided information is sufficient for the data packet processor to identify network interfaces of switches to transmit outgoing data packets.

Another aspect of the disclosure herein relates to a computer-readable medium with computer code instructions stored thereon, which, when executed by a processor, are configured to cause an apparatus to identify, based on routing information received from a controller, a network interface, corresponding to a switch of a plurality of switches, over which the corresponding switch is to transmit the outgoing data packet. The computer code instructions, when executed by a processor, also cause the apparatus to add an indication of the identified network interface to a header of the outgoing data packet, and forward the outgoing data packet to the identified switch.

DETAILED DESCRIPTION OF THE PREFERRED EMBODIMENTS

Following below are descriptions of various concepts related to, and implementations of, methods, apparatuses, and systems for handling data packets in an autonomous network. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
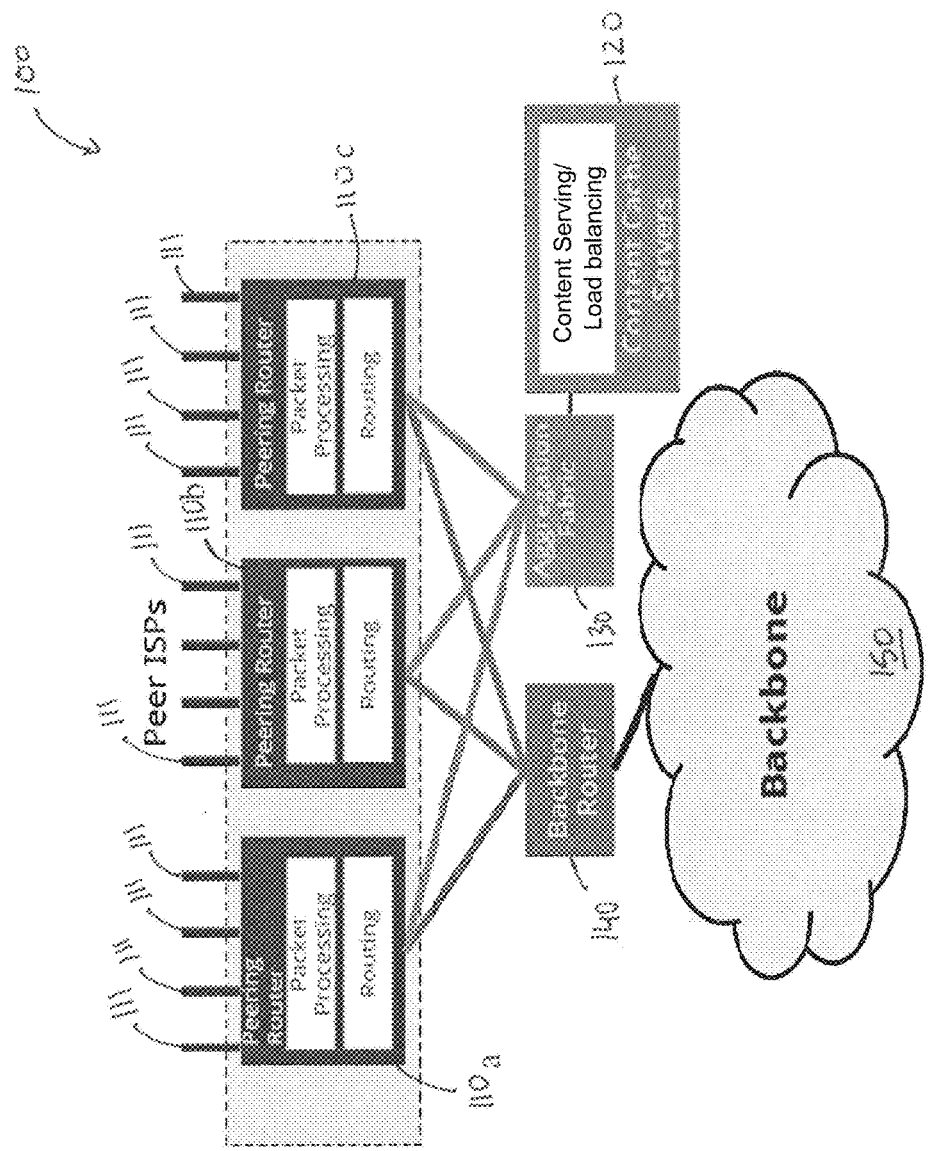
FIG. 1 is a diagram illustrating an example architecture of a traditional content delivery network.

FIG. 1 is a diagram illustrating an example architecture of a content delivery network 100. A content delivery network (CDN) is one example of an autonomous network. An autonomous network is a network having a plurality of Internet protocol (IP) routing prefixes and presenting a common routing policy to the Internet. Other types of autonomous networks include transfer networks, internet service providers (ISPs), autonomous service networks (ASNs), etc. The autonomous network 100 includes a plurality of edge routers 110a-110c (also referred to either collectively or individually as edge routers 110), a content cache server 120, an aggregation fabric 130, one or more backbone routers 140, and a backbone system 150.

The edge routers 110 are configured to handle data packets coming into the network and data packets being transmitted out of the network. In handling the data packets, edge routers 110 carry out data packet processing as well as routing. Each edge router 110 includes multiple communication interfaces, or ports, 111. Each port 111 corresponds to a peer network, e.g., an ISP or other autonomous network. The edge routers 110 establish external border gateway protocol (e-BGP) sessions with other peer content delivery networks. As part of the e-BGP sessions, the edge routers 110 exchange routing and reachability information with the other peer content delivery networks. The edge routers 110 are also configured to construct Internet routing tables, implement routing policies, and select best routing paths when routing data packets to other peer autonomous networks based largely on the information gained through the BGP sessions.

Besides routing control tasks, the edge routers 110 are also configured to perform packet processing such as access control list (ACL) filtering, fine-grain packet classification, inbound data packet encapsulation, or the like. Upon determining routing paths for corresponding data packets, the edge routers 110 forward the data packets to the next hop node with in the CDN 100 based on the determined paths.

The content cache server 120 is configured to serve content to requesting end-users and perform load balancing. That is, the content cache server 120 stores content and handles content requests from end-users. The content cache server 120 is also configured to perform load balancing by distributing incoming content requests among different content servers. Usually, multiple content servers store different duplicates of the same content. As such, the content cache server 120 distributes incoming requests for such content among the multiple content server in a way to balance their corresponding processing load and avoid overloading one or more of the multiple content servers. The content cache server 120 is coupled to the edge routers 110 through the aggregation fabric 130. The autonomous network 100 may employ more than one content cache server 120.

The aggregation fabric 130 interconnects the edge routers 110 to the content cache server 120 and to the backbone router(s) 140. The aggregation fabric 130 may be implemented using backbone routers.

The one or more backbone routers 140 are configured to route and forward data packets to and from the backbone system 150. The backbone routers 140 are coupled to the edge routers 110 and the backbone system 150.

The backbone system 150 includes one or more content servers (not shown in FIG. 1). The content servers are configured to store content and handle content requests, from end-users, requesting content that is not stored in the content cache server 120. In response to a content request received through a backbone router 140, a content server responds back with the content requested. The content requested is sent to an edge router 110, through one or more backbone routers 140, for delivering to the requesting end-user.

In terms of Internet peering, the network architecture illustrated in FIG. 1 is based around monolithic edge routers 110. That is, the edge routers 110 use the existing BGP protocol to (1) exchange reachability with other content delivery networks, and (2) distribute routing information among internal routing elements. Such an approach of using the BGP protocol was designed for relatively small scale and non-complex deployments, e.g., the landscape for BGP deployment in the mid 90's.

In the following, a network architecture that allows separating control-plane functionality from data-plane functionality is described. Control-plane functionality is handled by one or more data packet processors, whereas, data-plane functionality is distributed among the data packet processors and switches at the edge of the content delivery network. The data packet processors are separate from the switches at the edge of the content delivery network.

Figure 2:
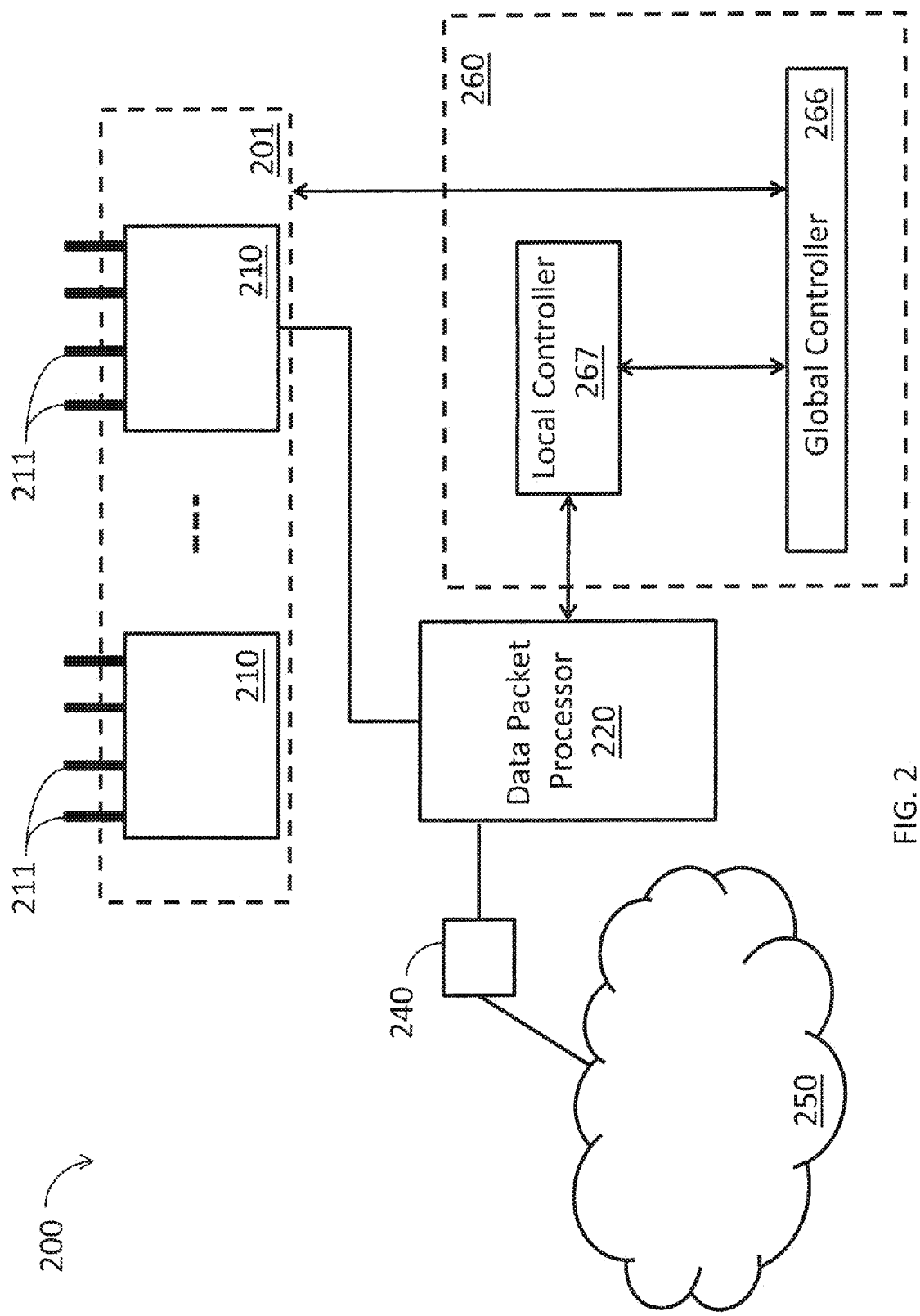
FIG. 2 is a diagram illustrating an example high-level architecture of a content delivery network.

FIG. 2 is a diagram illustrating an alternative example high-level architecture of a content delivery network 200. The architecture of the content delivery network 200 separates control-plane functionality from data-plane functionality at the edge of the network. The content delivery network 200 includes a peering fabric 201, routing control system 260, one or more packet processors 220, one or more backbone routers 240, and backbone system 250. While the architecture described below is discussed in the context of a content delivery network, a substantially similar architecture may be employed for other types of autonomous networks.

The peering fabric 201 includes a plurality of switches 210. The switches 210 can be relatively simple switching or router chips or commodity routers. The switches 210 need not have substantial computing power or routing intelligence. In some other implementations, the switches 210 can be any network element capable of forwarding an packet over a network. In some implementations, the peering fabric 201 is configured to handle forwarding-plane functionality with minimal to no routing intelligence. Each switch 210 of the peering fabric 201 includes a plurality of network interfaces 211. The switches 210 of the peering fabric 201 are configured to forward egress data packets from internal devices of the content delivery network 200 over network interfaces 211 specified in the headers of those data packets to peer networks. As the data packet headers already include an identification of which network interface 211 the data packet should be forwarded over, the switches 210 need not make any routing decisions with respect to the data packets or even know which peer network the data packet is intended to flow to. The switches 210 are also configured to forward data packets received from external peer networks, through the network interfaces 211, to corresponding ingress devices such as the data packet processor 220 or other devices of the content delivery network 200.

The routing control system 260 is configured to learn Internet routes from BGP speaker(s) (not shown in FIG. 2 but discussed in relation to FIG. 3) and internal routes from the routing control system 260. The routing control system 260 provides information regarding available routing paths to the one or more data packet processors 220. The routing control system 260 includes a global controller 266 and one or more local controllers 267. According to an alternative implementation, the routing control system 260 includes one or more global controllers 266 but no local controllers 267. According to yet another alternative implementation, the routing control system 260 includes one or more local controllers 267, that are configured to exchange routing information with other local controllers, but no global controller 266. A more detailed description of the functionalities of the global controller 266 and the local controller 267 is provided below in relation to FIG. 3.

The one or more data packet processors 220 reside in one or more edge appliances or edge servers. The one or more data packet processors 220 are located remotely from the switches of peering fabric 201. That is they are not in the same physical chassis, though they may be in the same data center or region of a data center. The one or more data packet processors 220 are configured to perform data packet routing based on the information regarding available routing paths received from the routing control system 260. In some implementations, the data packet processors 220 include or are powered by one or more single or multi-core general purpose processors.

For an outgoing data packet, a data packet processor 220 is configured to determine a switch 210 in the peering fabric 201 to forward the data packet out of the network and a corresponding network interface 211 associated with the determined switch 210 over which the switch should output the data packet. The data packet processor 220 then adds an indication of the determined switch and the corresponding network interface in a header of the data packet, and forwards the data packet with the added indication to the determined switch. In some implementations, the data packet processor 220 adds the indication as an MPLS or similar protocol label. In some implementations, the data packet processor 220 adds the indication by encapsulating the packet with a GRE header (or some other encapsulating header, such as a VLAN header) identifying the switch and the network interface. In some implementations, the data packet processor 220 may add multiple labels or multiple layers of encapsulation to provide specific routing instructions for forwarding the data packet from the data packet processor 220 to the desired switch in the peering fabric. Upon receiving the data packet from the data packet processor 220, the identified switch removes the indication from the data packet, for example by removing the encapsulation or by popping the MPLS label, and transmits the data packet over the network interface 211 referred to by the indication.

Besides routing, the one or more data packet processors 220 are configured to perform data packet processing, such as, data packet filtering, data packet classification, and/or other per-packet functionalities.

The one or more backbone routers 240 are configured to route and forward data packets to and from the backbone system 250. The backbone routers 240 are coupled to the one or more data packet processors 220 and the backbone system 250.

The backbone system 250 includes one or more content servers (not shown in FIG. 2). The content servers are configured to store content and handle content requests received from end-users. In response to a content request received through a backbone router 240, a content server responds back with the content requested. The content requested is sent to the one or more data packet processors 220, through one or more backbone routers 240, for routing and forwarding to the original requester via the peering fabric 201.

According to the architecture described in FIG. 2, the functionalities usually performed by edge routers 110 are distributed among the routing control system 260, the one or more data packet processors 220, and the peering fabric 201.

Figure 3:
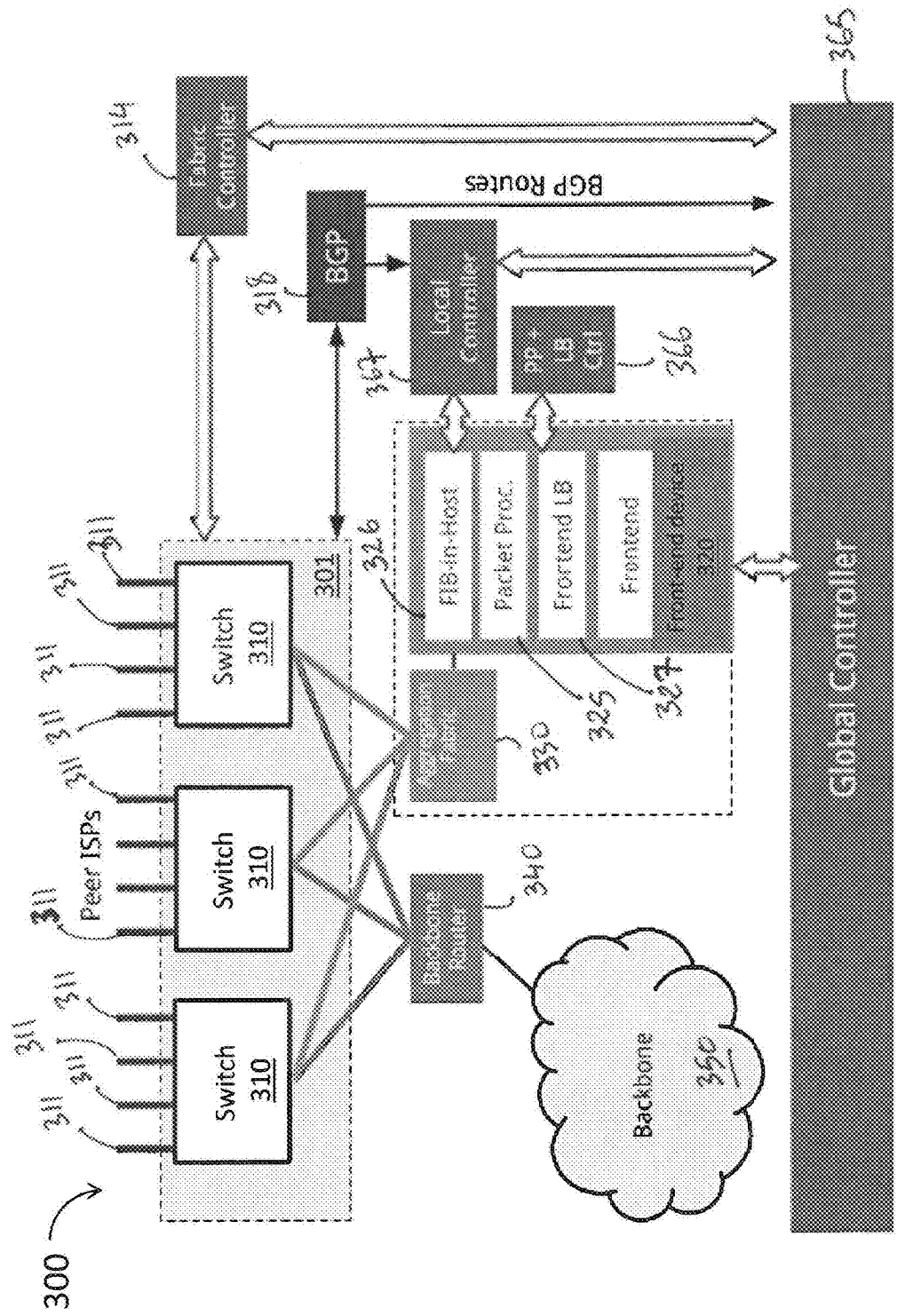
FIG. 3 shows an example more detailed block diagram of the architecture of the content delivery network shown in FIG. 2.

FIG. 3 shows an example more detailed architecture of a content delivery network 300. The content delivery network 300 includes a peering fabric 301, fabric controller 314, BGP speaker 318, front-end device 320 including one or more data packet processors 325, global and local controllers 365 and 367, packet processor/load-balancing controller 366, aggregation fabric 330, one or more backbone routers 340, and a backbone system 350. As with the architecture shown in FIG. 2, the architecture shown in FIG. 3 can readily be used with other autonomous networks other than CDNs, as well.

The peering fabric 301 includes a plurality of switches 310 at the edge of the network 300. Each switch 310 includes multiple network interfaces 311. Each switch 310 is configured to forward data packets from an ingress device of the content delivery network 300 over network interfaces 311 specified in the headers of those data packets to peer networks. As the data packet headers already include an identification of which network interface 311 the data packet should be forwarded over, the switches 310 need not make any routing decisions with respect to the data packets or even know which peer network the data packet is intended to flow to. Also, each switch 310 is configured to forward data packets received from an external device or other network to a corresponding ingress device, e.g., the front-end device 320, the backbone router 340, or the like, of the content delivery network 300. The switches 310 in the peering fabric 310 can be connected to one another and to the remaining components of the network 300 via the aggregation fabric 330, which in turn can include a hierarchy of switches to facilitate routing of packets to and from the switches 310 in the peering fabric 301.

Upon receiving a data packet addressed to another network or a device outside the content delivery network 300, the switch 310 obtains, from a header of the outgoing data packet, an indication of a network interface 311 over which to transmit the outgoing data packet. In particular, the switch parses the header of the outgoing data packet to retrieve the indication. The network interface 311 referred to by the indication retrieved from the header is designated for transmitting the outgoing data packet addressed to a given network or device outside the content delivery network 300. In other words, each network interface 311 corresponds to a given external device or other network. In some implementations, two or more network interfaces 311 may be trunked to direct data traffic to the same external device or other network. In some implementations, the switch 310 receiving the data packet is configured to remove the information, e.g., the one or more added headers or MPS labels, indicative of the switch 310 and the corresponding network interface 311 from the data packet before transmitting the data packet. As such, the switches 310 do not need to be programmed with many, if any, routing rules or routing information to forward the outgoing data packet toward its corresponding destination. As a result, the routing state carried by the peering fabric 301, or any corresponding switch 310, is substantially minimized. In contrast, a person of ordinary skill in the art would appreciate that in traditional routers 110, carrying large Internet-scale routing table is one of the key factors contributing to router cost and their limited scalability.

The peering fabric 301, or any corresponding switch 310, carries very little, or no, routing state. As such, the peering fabric 301 is implemented, for example, using simple commodity switching/routing chips. Employing simple commodity switching/routing chips allows easy and very cost effective scalability of the peering fabric 301. In some implementations, the switches 310 in the peering fabric 301 support standard Ethernet, synchronous optical network (SONET), and/or synchronous digital hierarchy (SDH) interfaces in communications with other networks or devices external to the content delivery network 300.

The fabric controller 314 is coupled to the peering fabric 301. In some implementations, the fabric controller 314 serves as a software defined network (SDN) controller for the switches making up the peering fabric 301. As such, the fabric controller 314 is configured to control the peering fabrics 301, for example, through SDN software running on the fabric controller 314. The fabric controller 314 is also coupled to the global controller 365. The fabric controller 314 is configured to receive information and/or instructions from the global controller related to controlling, or programming, the peering fabric 301. The fabric controller 314 is further configured to receive status information from switches 310 that make up the peering fabric 301. The fabric controller 314 can then pass such status information (such as information indicating the failure of a switch or a network interface of the switch) to the local controller 366 and/or the global controller 367, such that routes can be updated if necessary. In some implementations, the fabric controller 314 is also coupled to the aggregation fabric 330, and may serve as a SDN controller of the switches therein.

The BGP speaker 318 is coupled to the peering fabric 301, and is configured to establish BGP sessions with peer networks and other external devices. The BGP speaker 318 is also configured to construct Internet routing tables, for example, based on established sessions with other networks, or external devices. The BGP speaker 314 is coupled to the global controller 365 and the local controller 366. The BGP speaker 314 provides information regarding available Internet routes through the switches 310 of the peering fabric 301 to the global controller 365 and/or the local controller 367. According to at least one example implementation, the BGP speaker 314 resides in an edge server, or edge network element.

The routing controllers, i.e., the global/local controllers 365 and 367, are configured to coordinate among, and control, network routing applications and edge resources to deliver end-to-end connectivity. In particular, the global and/or local controllers 365 and 367 collect information regarding available Internet routes, e.g., routing tables, from the BGP speaker 318, as well as internal route information from the fabric controller 314 or directly from the switches in the peering fabric 301, aggregation fabric 330 and backbone router 340. In some implementations, the internal route information can include a set of service classes supported over the internal routes, the volume of traffic (either in the aggregate or per supported traffic class) on the routes, or information about the quality of the routes (e.g., bandwidth, latency, etc.). In some implementations, the global controller 365 collects such information from BGP speakers located in different sub-networks, e.g., associated with different geographical/metropolitan areas or other separately administered groups of edge devices, of the content delivery network 300. The local controller 367 may only collect the routing information from local BGP speaker(s) 314 located in the same sub-network as the local controller 367. The global/local controllers 365 and 367 are also configured to push information indicative of available routes to front-end device 320. For example, the global and/or local controllers 365 and 367 provide routing information, to the front-end device 320, sufficient to maintain a complete forwarding information base (FIB) at the front-end device 320.

In some implementations, the global controller 365 is configured to maintain a global view of the Internet, with limited knowledge regarding the internal operations or routes within any of the edge networks associated with the network 300 or within any peer network. To that end, the global controller is configured to keep track of available Internet routes, for example, as perceived by BGP speakers located at different sub-networks of the content delivery network. The global controller is also configured to push information, e.g., rules and/or updates of available Internet routes, to the front-end device 320 either directly or through the local controller 367. For example, the global controller 365 reacts to an Internet link going down by sending rules or information to the front-end device 320 for adjusting the corresponding maintained FIB. The global controller 365 may not be aware of internal routes, i.e., between internal devices in a particular sub-network, and/or changes thereof.

The routing information collected by the global controller 365 includes information indicative of available external network routes, statuses of external networks or sub-networks, latency information associated with external network routes or links, congestion information, or the like. As such, it is capable of determining routes based on more information than is typically used in BGP routing, which selects routes based on a fewest number of hops basis. Instead, the global controller can route packets along paths that may not have the fewest number of hops, but which may have lower latency, higher bandwidth, higher reliability, or which honor quality of service indicators that other networks may not. The global controller 365 is also configured to receive control information, e.g., DoS mitigation information, configuration information, or other control information, from other control applications or systems. The global controller can process this information to update the packet processing and filtering rules applied by the data packet processors 325 in real, or near-real time. The global controller 365 is also configured to forward at least part of the control information received to the local controller 367.

The local controller 367 is configured to maintain a local view of the sub-network where it resides. In particular, the local controller 267 is configured to keep track of internal routes and local network performance. The local controller 267 also keeps track of available Internet routes learned from the local BGP speaker 318. In response, to changes in the internal routes or in the Internet routes learned from the local BGP speaker 318, the local controller 367 pushes rules or routing information updates to front-end device 320 for updating the corresponding FIB.

In order to support five-9 availability of the peering edge, the routing controllers 365 and 367 are designed to tolerate any individual component failure, hardware or software, with controlled failover mechanisms. In particular, the routing controllers 365 and 367 are configured to provide a metro-local synaptic response to cases where controller assigned routes are stale, e.g., if a route is withdrawn from a controller assigned port or if a link goes down. In such cases, the routing controllers 365 and/or 367 learn route availability, and push rules or updates to available routes to the front-end device 320 that allow the front-end device 320 to fallback to alternative routes. In other words, the routing controllers 365 and/or 367 are configured to react to available routes' changes and provide proper updates to the front-end device 320. Moreover, the routing control hierarchy in the architecture of FIG. 3 allows the content delivery network 300 to provide a high availability level. That is, assigning the determining of available external network routes to the routing controllers 365 and 367, the routing of outgoing data packets to data packet processors 325, and the transmission of outgoing data packets to the peering fabric 301 allows for fast routing adaptation to changes in the content delivery network 300 and external networks or sub-networks.

The front-end device 320 includes one or more data packet processors 325. The data packet processor 325 is configured to perform routing and other data packet processing operations. In some implementations, the data packet processor 325 is configured to maintain a complete FIB 326. According to at least one implementation, the FIB 326 is stored in a cache memory, e.g., level-two (L2) cache, of the data packet processor. Alternatively, the FIB 326 is stored in an off processor memory within the front-end device 320, e.g., a dynamic random access memory (DRAM). In some implementations, portions of the FIB are stored in cache memory, while portions are stored in RAM. The data packet processor 325 is configured to dynamically update the FIB 326 as it learns of changes to available routes and/or statuses of external network devices/elements. In particular, the data packet processor 325 receives information indicative of routing rules and/or updates to the FIB 326 from the local controller 367 and/or global controller 365. In response, the data packet processor 325 updates the FIB 326 based on the information received.

The data packet processor 325 is also configured to route outgoing data packets. In particular, the data packet processor 325 determines a route and/or an external next hop for the received outgoing data packet based on the FIB. The data packet processor 325 determines a switch 310 in the peering fabric 301 and/or a corresponding network interface 311 for transmitting the outgoing data packet to the corresponding external next hop. The data packet processor 325 adds an indication of the determined switch 310 and corresponding network interface 311 in a header of the data packet. In some implementations, the data packet processor 325 adds the indication as an MPLS label. In some implementations, the data packet processor 325 adds the indication by encapsulating the packet with a GRE header identifying the switch and the network interface. In some implementations, the data packet processor 325 may add multiple MPLS labels or multiple layers of GRE encapsulation to provide specific routing instructions for forwarding the data packet from the data packet processor 325 to the desired switch in the peering fabric. In some other implementations, the data packet processor 325 may add labels other than MPLS labels to the packet header or encapsulate the packet using other forms of encapsulation other than GRE encapsulation, for example VLAN encapsulation. The data packet processor 325 then forwards the modified outgoing data packet to the determined switch, for example, through the aggregation fabric 330.

Besides routing outgoing data packets, the data packet processor is also configured to perform data packet filtering on incoming data packets. For example, the data packet processor 325 applies ACL filtering to incoming data packets. In addition, because the data packet processor 325 can be implemented on a general purpose processor, the data packet processor 325 can be programmed with more complex filtering rules than can typically programmed into a typical router. In addition, such rules can be readily updated in real or near-real time as new threats to the network are discovered. According to an example implementation, the data packet processor 325 applies dynamic denial of service (DoS) filtering on incoming data packets. The network architecture in FIG. 3 allows for DoS protection rules to be inserted dynamically through intelligent centralized services, such as, the global controller 365 and/or other control applications. According to an example implementation, the data packet processor 325 is coupled to a controller, e.g., the local controller 367 or controller 366, through a software defined network (SDN) interface, e.g., OpenFlow, to allow for dynamically inserting packet matching rules against all incoming flows.

According to other implementations, the data packet processor 325 is configured to control data flow rate. For example, the data packet processor 325 enforces predefined data rates on a per-flow basis. The data packet processor 325 may also pace data packet transmission in order to avoid buffer overflow at the peering fabric 301. For example, even though a FIFO queue may contain 64 consecutive data packets to the same egress port, the packet processor may choose to interleave transmission of data packets to other destinations to ensure that a single flow's bursts do not overflow limited buffers in the peering fabric 301. A person of ordinary skill in the art would appreciate that other per-packet processing tasks may be performed by the data packet processor(s) 325.

According to an example implementation, the data packet processors 325 utilize single or multi-core general purpose processors. In some implementations, the data packet processors 325 can employ several single or multi-core general purpose processors operating in parallel. The data packet processors 325 may also utilize core processors dedicated to perform routing and/or data packet processing tasks within one or more multi-core processors.

The front-end device 320 includes a front-end server or another front-end network element. For example, the front-end device 320 may be a front-end server relying on the capabilities of modern multi-core processors where one core of a multi-core processor performs simple line rate data packet processing at 10 Giga bits per second (Gb/s), e.g., 15 million (M) data packets per-second. As such, the network architecture of FIG. 3 allows absorbing line rate DOS attacks as well as mitigating such attacks either by programming filters at the peering fabric or by filtering the data packets at the packet processor itself. According to at least one example implementation, all attacks that are at the transport control protocol (TCP) level and below, including the TCP SYN attacks, are handled at the data packet processing layer, which runs above the kernel of the front end device 320. According to an example implementation the front-end device 320 includes a load balancing module 327. Alternatively, load balancing is performed by another device, or network element, other than the front-end device 320 where the data packet processors 325 reside.

The network architecture of FIG. 3 also allows provisioning of content delivery network 300 beyond the data packet processing layer for only the "clean" non-DoS traffic. The architecture also allows for a 1+1 redundant pool of data packet processors 325, housed in physically diverse redundant points of presences (POPs), in every metropolitan area or sub-network.

The controller 366 is configured to control the data packet processor(s) 325 and/or the load balancing module 327.

The aggregation fabric 330 includes a set of routers and/or switches coupling the front-end device 320 and/or the data packet processors 325 to the peering fabric 301. The backbone routers 340 are configured to couple the backbone system 350 to the peering fabric 301 and/or the data packet processors 325. The backbone system 350 includes one or more content servers serving content to requesting end-users.

Figure 4:
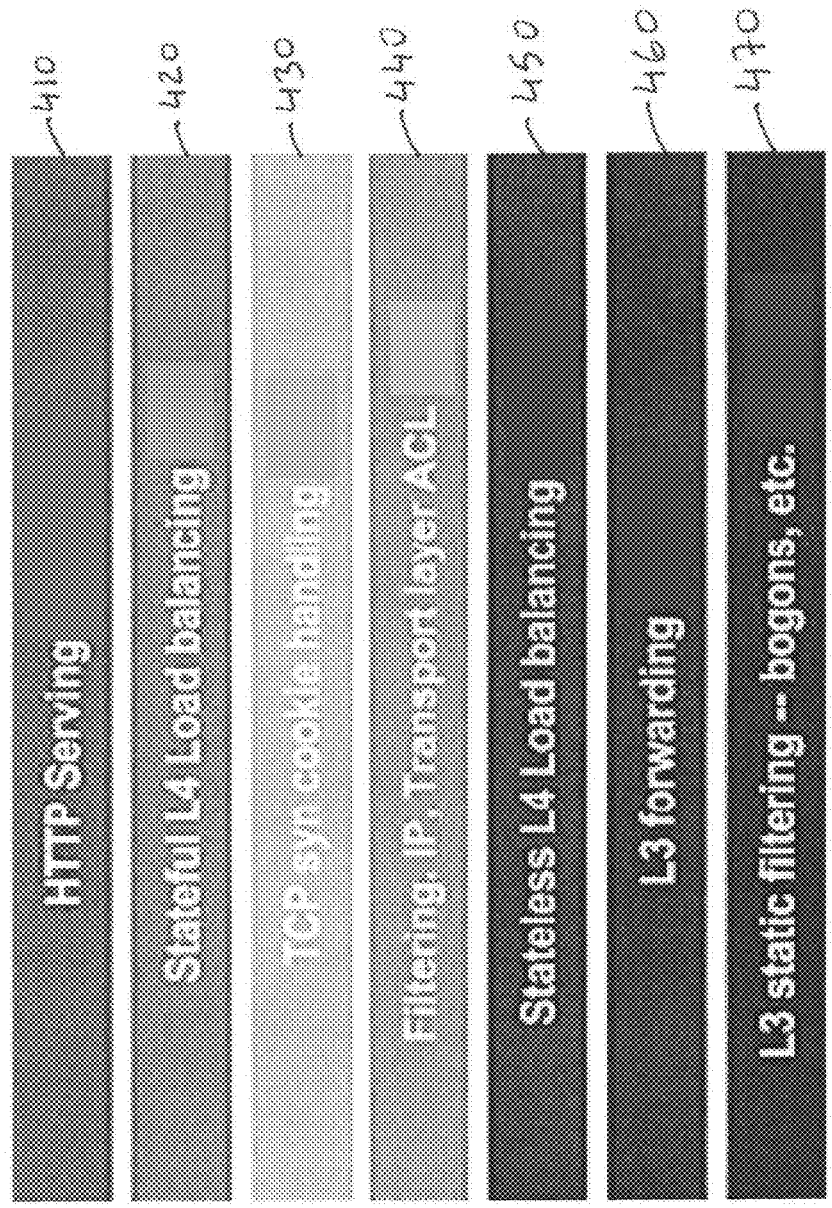
FIG. 4 is a block diagram illustrating an example layered data packet and content request processing model.

FIG. 4 is a block diagram illustrating an example layered data packet and content request processing model. The network architecture described in relation to FIG. 3 allows fine-grained layered data packet and request processing, and dynamically moving layers logically and physically. Layers of data packet processing include hypertext transfer protocol (HTTP) serving 410, stateful layer-four (L4) load balancing 420, transport control protocol (TCP) cookie handling 430, data packet filtering 440, stateless L4 load balancing 450, layer-three (L3) forwarding 460, and L3 static filtering 470. The layers 410-470 of data packet processing are ordered both in terms of sequence of operations, and in terms of desirability for keeping at the edge of the network 300. According to an example implementation, the bottom three layers 450-470 live in the peering fabric 301 permanently. The upper layers 410-440 live in the data packet processing and request handling applications. Given that it may be beneficial to keep as many layers at the edge of the network as possible, lowest priority layers, e.g., 410-440, are assigned first to data packet processors 325, while higher priority layers, e.g., 450-470, are performed closer to the edge of the network, that is at the peering fabric 301.

Figure 5:
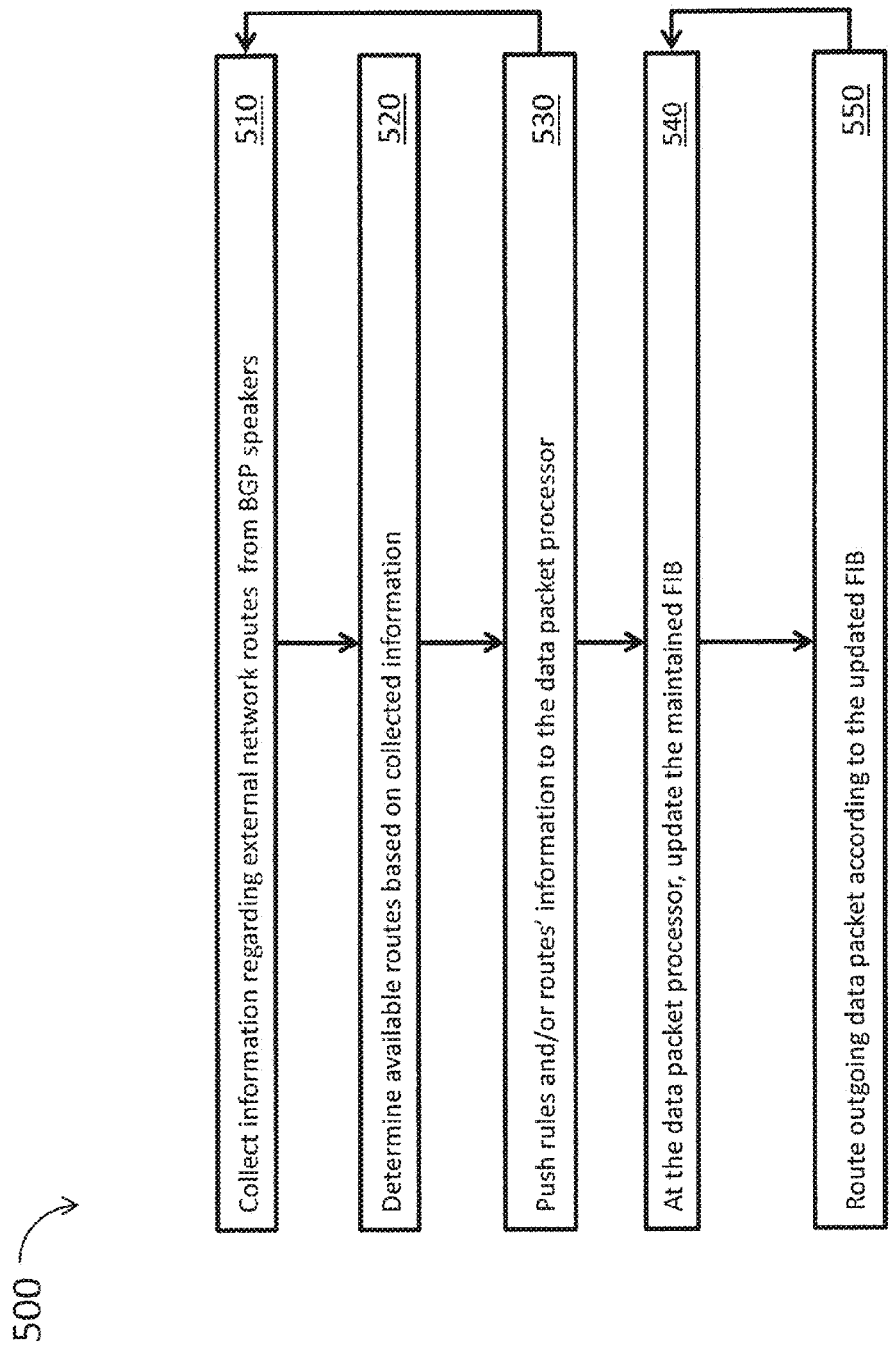
FIG. 5 is a flow chart illustrating an example method of managing and employing routing information within an autonomous network.

FIG. 5 is a flow chart illustrating a method 500 of managing and employing routing information within an autonomous network. The routing controllers 365 and/or 367 collect information regarding external network routes, for example, from BGP speakers 318 (step 510). The routing controllers 365 and/or 367 determine routes for routing data packets based on the collected information (step 520). The routing controllers 365 and/or 367 push rules and/or routes' information to the data packet processors 325 (step 530). The data packet processors 325 update a maintained FIB based on the rules and/or routes' information received from the routing controllers 365 and/or 367 (step 540). The processes 510-540 iterate allowing dynamic adaptability to changes in status and topology of different networks across which data packets are exchanged. The data packet processors 325 route outgoing data packets based on the maintained FIB (step 550).

Figure 6:
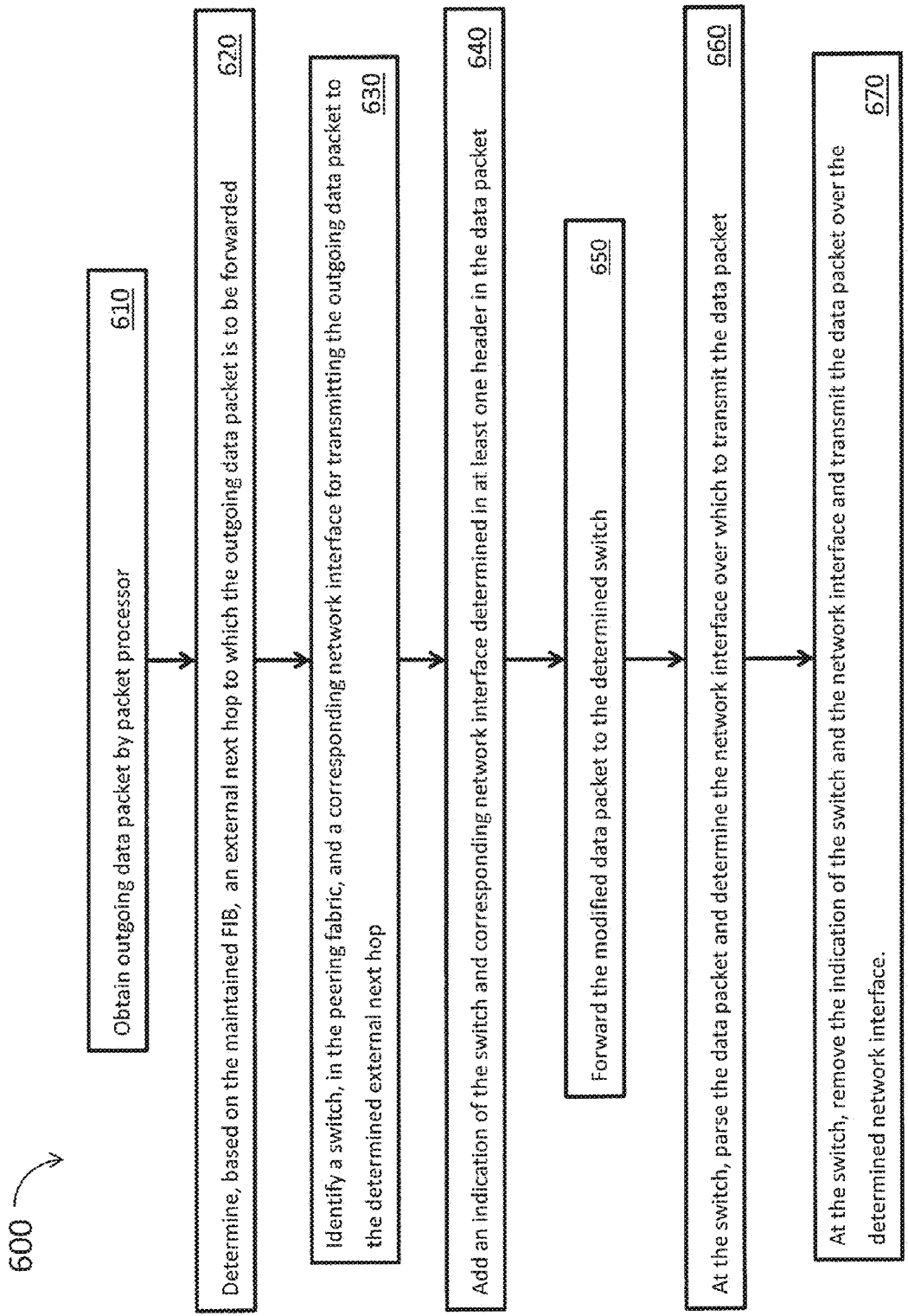
FIG. 6 is a flowchart illustrating an example method for processing an outgoing data packet.

FIG. 6 is a flowchart illustrating a method 600 for processing an outgoing data packet. The data packet processor 325 obtains an outgoing data packet (step 610). Upon obtaining the outgoing data packet, the data packet processor 325 identifies an external next hop to which the outgoing data packet is to be forwarded (step 620). Identifying the external hop includes identifying a route for the outgoing data packet based on, for example, a final destination indicated in the received outgoing data packet. The data packet processor 325 identifies the route based on a stored FIB. The data packet processor 325 then determines a network interface 311, associated with a switch 310 in the peering fabric 301, for forwarding the outgoing data packet to the external next hop (step 630). According to an example implementation, determining the network interface 311 includes determining the corresponding switch 310.

The data packet processor 325 adds an indication of the determined network interface 311 in a header of the outgoing data packet (step 640). The indication may also be indicative of the switch 310 corresponding to the identified network interface 311. The data packet processor 325 then forwards the modified data packet to the switch 310 having the identified network interface 311 (step 650). Upon receiving the outgoing data packet, the switch 310 parses the data packet header (s) to determine the network interface 311 over which to transmit the outgoing data packet (step 660). The switch then removes the indication added by the data packet processor 325 and transmits the outgoing data packet over the determined network interface 311 (step 670). According to an example implementation, removing the indication by the switch 310 includes removing one or more headers or popping one or more MPLS labels added by the data packet processor 325.

Figure 7:
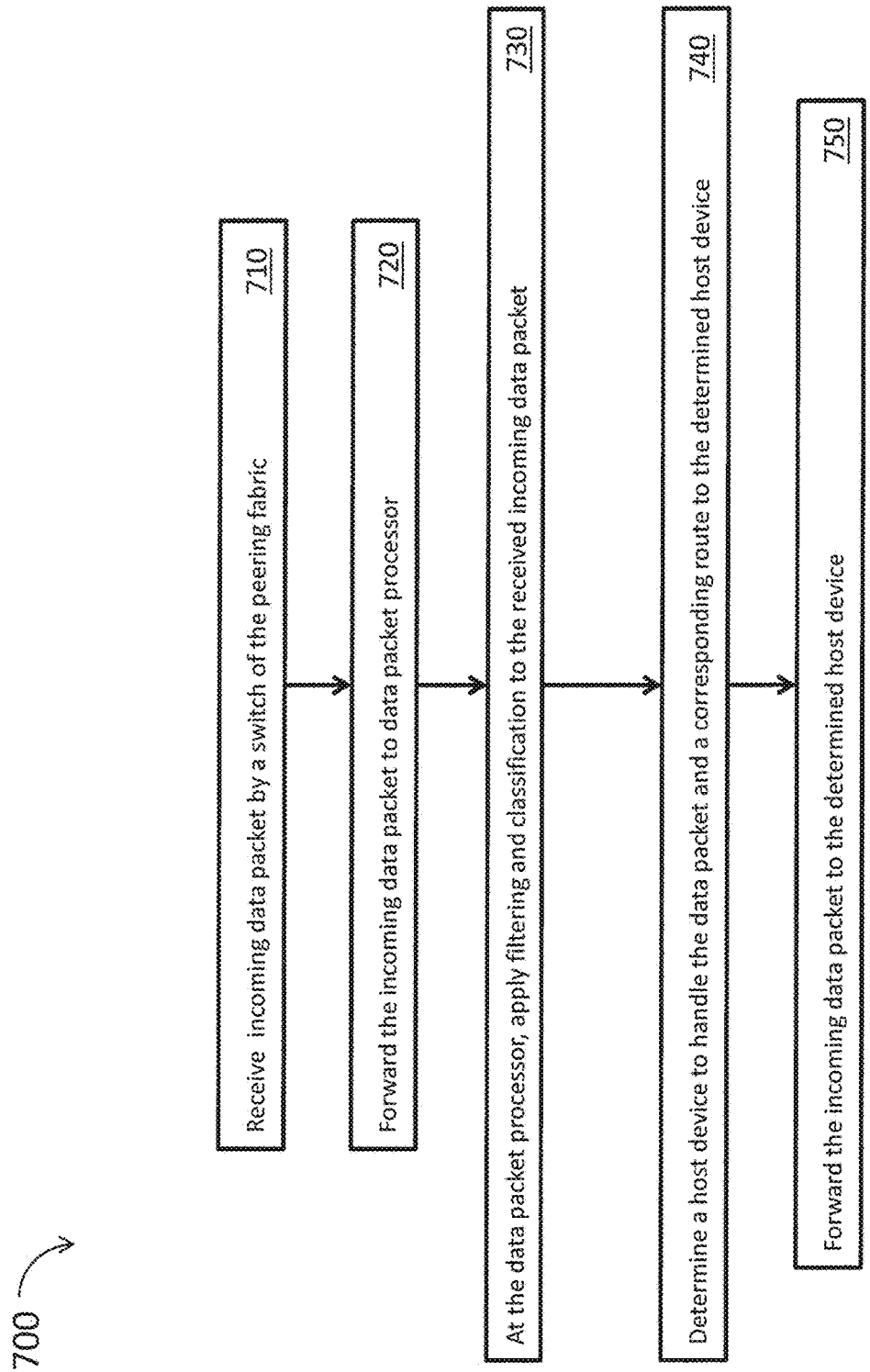
FIG. 7 is a flowchart illustrating an example method for processing an incoming data packet.

FIG. 7 is a flow chart illustrating a method 700 of processing incoming data packets. A switch 310 in the peering fabric 301 receives an incoming data packet from an external device (step 710). The switch forwards the received incoming data packet to the data packet processor 325 (step 720), for example, through the aggregation fabric 330. The data packet processor 325 applies filtering and/or data packet classification to the incoming data packet (step 730). The data packet processor 325 then determines a host device (such as a content server or other application server) for handling a request associated with the incoming data packet (step 740). The data packet processor 325 forwards the incoming data packet to the determined host device for handling the corresponding request (step 750).

The network architecture of FIG. 3 is separates data-plane functionality from control-plane functionality. The use of data packet processors 325 to perform routing and data packet processing allows for flexibility and optimized implementations for data-plane and control plane tasks. While different types of processors may be employed as data packet processors, the architecture described in relation to FIGS. 2 and 3 allows for use of general purpose processors as data packet processors, and does not necessitate the use of specialized application-specific integrated circuits (ASICs), or network processing units (NPUs). Also, in the data packet processors 325, cache memory, e.g., relatively inexpensive, abundant, and higher capacity L2 cache, may be used to store the FIB, instead of many lower capacity, expensive, and energy consuming memories often used in more advanced routers to store similar information.

Furthermore, the architecture described in relation to FIGS. 2 and 3 allows for fast and dynamic adaptability to changes in network topologies and statuses, and, therefore, is suitable for providing high availability. The use of data packet processors as described in relation to FIGS. 2 and 3 allows for dealing with large-scale cyber-attacks at the data-plane. In fact, the data packet processors 325 are capable of handling deep data packet inspection and parsing as well as stateful processing, and, therefore, are capable of handling a wide range of security threats.

Figure 8:
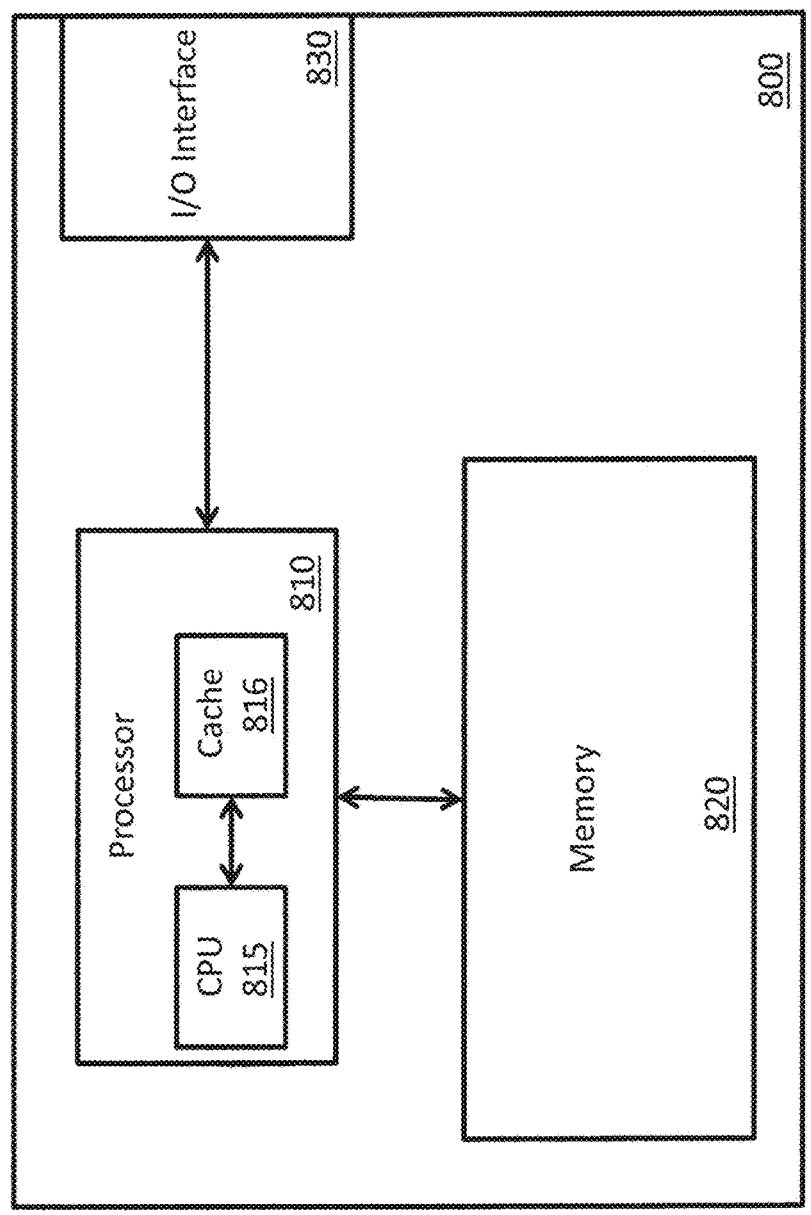
FIG. 8 is a block diagram of an example computer device.

FIG. 8 is a block diagram of a computer device 800. The computer device includes a processor 810 having a central processing unit (CPU) 815 and a cache memory 816. The CPU 815 may also include another cache memory. The computer device 800 also includes a memory 820 coupled to the processor 810 via a data bus. Computer code instructions, for execution by the CPU 815, may be stored in the memory 810 and/or the cache memory 816. Such computer code instructions correspond, for example, to processes performed by the data packet processor 325. According to another example, the computer code instructions correspond to processes performed by the global controller 365 and/or the local controller 367. The computer device 800 also includes and input/output (I/O) interface 830 coupled to the processor 810 and configured to communicate with other devices. A person of ordinary skill in the art would appreciate that the processor 810 may be a single-core processor or a multi-core processor. According to an example implementation, the computer device 800 represents the front-end device 320. The computer device 800 may also, or alternatively, represent the global controller 365, the local controller 367, or other device of the network 300.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The terms "computer" or "processor" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

What is claimed is:

1. An autonomous network comprising:
   a plurality of switches, each switch including a plurality of network interfaces, and is configured to:
      receive a data packet addressed to a device located outside the network (an "outgoing data packet");
      obtain from a header of the received outgoing data packet data indicative of a network interface of the switch over which to transmit the outgoing data packet; and
      transmit the outgoing data packet over the network interface indicated in the data obtained from the header;
   a non-switching data packet processor that is separate and independent of any switch, wherein the data packet processor comprises a general purpose processor configured, for an outgoing data packet, to:
      identify one of the plurality of switches of the autonomous network and a network interface of the identified switch via which the identified switch is to transmit the outgoing data packet out of the autonomous network;
      add an indication of the identified switch and the identified network interface of the identified switch to a header of the outgoing data packet; and
      forward the outgoing data packet to the identified switch;
   a controller configured to:
      determine routing paths for routing data packets; and
      provide routing information, associated with the determined routing paths, to the data packet processor, sufficient for the data packet processor to identify switches and network interfaces of switches to transmit outgoing data packets.

2. The autonomous network of claim 1, wherein in determining the routing paths, the controller is further configured to:
   collect information from network elements of the autonomous network; and
   determine the routing paths based on the collected information.

3. The autonomous network of claim 2, wherein in collecting the information, the controller is further configured to collect information regarding Internet routing paths from a border gateway protocol (BGP) module.

4. The autonomous network of claim 2, wherein in collecting the information, the controller is further configured to collect information regarding internal routing paths from backbone network elements of the autonomous network.

5. The autonomous network of claim 4, wherein the information regarding the internal routing paths includes at least one of information about the volume of traffic across the paths, the service classes supported across the paths, and quality of the paths.

6. The autonomous network of claim 1, wherein in adding an indication of the identified switch and the identified network interface, the data packet processor is further configured to encapsulate the data packet with a general routing encapsulation (GRE) header or to add a multiprotocol label switching (MPLS) label to the header of the data packet.

7. The autonomous network of claim 1, wherein the data packet processor is further configured to filter data packets originating outside the autonomous network.

8. The autonomous network of claim 7, wherein filtering includes at least one of access control list (ACL) filtering and dynamic denial of service (DoS) filtering.

9. The autonomous network of claim 1, wherein the data packet processor is further configured to, in response to receiving a synchronize (SYN) data packet from a device located outside of the autonomous network, generate a secure SYN acknowledgement for transmission to a device originating the SYN data packet.

10. The autonomous network of claim 1, wherein in transmitting the outgoing data packet, an edge switch of the plurality of switches is configured to:
    remove the indication of the identified switch and the identified network interface; and
    transmit the data packet, with the indication removed, over the network interface indicated in the data obtained from the header.

11. The autonomous network of claim 1, wherein the data packet processor includes a cache memory, and is further configured to store the routing formation received from the controller in the cache memory.

12. The autonomous network of claim 1, wherein the data packet processor includes a plurality of general purpose processors configured to operate in parallel.

13. A method for handling data packets in an autonomous network, comprising:
    receiving, by a switch of a plurality of switches included in the autonomous network, a data packet addressed to a device located outside the autonomous network (an "outgoing packet"), each switch of the plurality of switches including a plurality of network interfaces;

obtaining, by the switch, from a header of the received outgoing data packet data indicative of a network interface of the switch over which to transmit the outgoing data packet; and transmitting, by the switch, the outgoing data packet over the network interface indicated in the data obtained from the header;

identifying, by a non-switching data packet processor that is separate and independent any switch and comprises a general purpose processor, one of the plurality of switches and a network interface of the identified switch via which the identified switch is to transmit the outgoing data packet out of the autonomous network;

adding, by the data packet processor, an indication of the identified switch and the identified network interface of the identified switch to a header of the outgoing data packet; and forward, by the data packet processor, the outgoing data packet to the identified switch;

determining, by a controller, routing paths for routing data packets;

providing, by the controller, routing information, associated with the determined routing paths, to the data packet processor, sufficient for the data packet processor to identify switches and network interfaces of switches to transmit outgoing data packets.

14. The method of claim 13, wherein determining the routing paths includes:

collecting information from network elements of the autonomous network; and determining the routing paths based on the collected information.

15. The method of claim 14, wherein collecting the information includes collecting information regarding Internet routing paths from a border gateway protocol (BGP) module.

16. The method of claim 14, wherein collecting the information includes collecting information regarding internal routing paths from backbone network elements of the autonomous network.

17. The method of claim 16, wherein the information regarding the internal routing paths includes at least one of information about the volume of traffic across the paths, the service classes supported across the paths, and quality of the paths.

18. The method of claim 14, wherein adding an indication of the identified switch and the identified network interface includes encapsulating the data packet with a general routing encapsulation (GRE) header or adding a multiprotocol label switching (MPLS) label to the header of the data packet.

19. The method of claim 13 further comprising filtering, by the data packet processor, data packets originating outside the autonomous network.

20. The method of claim 19, wherein filtering includes at least one of access control list (ACL) filtering and dynamic denial of service (DoS) filtering.

21. The method of claim 13 further comprising, in response to receiving a synchronize (SYN) data packet from a device located outside the autonomous network, generating, by the data packet processor, a secure SYN acknowledgement for transmission to a device originating the SYN data packet.

22. The method of claim 13, wherein transmitting the outgoing data packet over the network interface includes:

removing the indication of the identified switch and the identified network interface; and transmitting the data packet, with the indication removed, over the network interface indicated in the data obtained from the header.

23. The method of claim 13, wherein the data packet processor includes a plurality of general purpose processors configured to operate in parallel.

24. The method of claim 13 further comprising storing, by the data packet processor, the routing formation received from the controller in a cache memory of the data packet processor.

25. A computer-readable medium with computer code instructions stored thereon, the computer code instructions, when executed by a general purpose processor, are configured to cause an apparatus within an autonomous network to:

identify, based on routing information received from a controller, one of a plurality of switches and a network interface of the identified switch via which the identified switch is to transmit the outgoing data packet out of the autonomous network;

add an indication of the identified switch and the identified network interface of the identified switch to a header of the outgoing data packet; and forward the outgoing data packet to the identified switch, wherein the general purpose processor is separate and independent of any switch.

* * * * *